United States Patent [19]

Schwarz

[11] Patent Number: 4,537,222
[45] Date of Patent: Aug. 27, 1985

[54] HIGH-PRESSURE HOSE AND METHOD FOR THE MANUFACTURE OF SAME

[75] Inventor: Hans G. Schwarz, Weinheim-Waid, Fed. Rep. of Germany

[73] Assignee: Polyflex Schwarz GmbH & Co., Hüttenfeld, Fed. Rep. of Germany

[21] Appl. No.: 591,544

[22] Filed: Mar. 20, 1984

Related U.S. Application Data

[63] Continuation of Ser. No. 381,648, May 24, 1982, Pat. No. 4,444,707.

[30] Foreign Application Priority Data

May 23, 1981 [DE] Fed. Rep. of Germany ....... 3120688

[51] Int. Cl.³ ................................................. B32B 1/08
[52] U.S. Cl. .................................... 138/130; 138/133; 264/103; 264/173; 264/174
[58] Field of Search ................... 264/103, 174, 173; 138/125, 127, 130, 133

[56] References Cited

U.S. PATENT DOCUMENTS

| | | | |
|---|---|---|---|
| 2,151,307 | 3/1939 | Smith | 138/130 |
| 2,280,252 | 4/1942 | Muehleck | 156/144 |
| 2,513,106 | 6/1950 | Prendergast | 264/173 |
| 2,730,133 | 1/1956 | Holland-Bowyer et al. | 138/127 |
| 2,810,424 | 10/1957 | Swartswelter et al. | 264/174 |
| 2,829,671 | 4/1958 | Ernst et al. | 138/127 |
| 2,980,959 | 4/1961 | Genovese | 264/281 |
| 3,019,154 | 1/1962 | Helly-Hansen | 156/143 |
| 3,138,511 | 6/1964 | Cadwallader | 156/143 |
| 3,212,528 | 10/1965 | Haas | 138/130 |
| 3,336,172 | 8/1967 | Hall et al. | 156/143 |
| 3,791,415 | 2/1974 | Lawless et al. | 138/127 |
| 4,166,000 | 8/1979 | Lawson | 156/143 |
| 4,196,031 | 4/1980 | Lalikos et al. | 156/143 |
| 4,219,522 | 8/1980 | Oyama | 264/173 |
| 4,342,612 | 2/1982 | Lalikos et al. | 156/143 |
| 4,384,595 | 5/1983 | Washkewicz et al. | 138/127 |
| 4,444,707 | 4/1984 | Schwarz | 264/103 |
| 4,459,168 | 7/1984 | Anselm | 156/143 |

FOREIGN PATENT DOCUMENTS

| | | | |
|---|---|---|---|
| 1188388 | 3/1965 | Fed. Rep. of Germany . | |
| 2014887 | 1/1971 | Fed. Rep. of Germany . | |
| 2223523 | 11/1973 | Fed. Rep. of Germany . | |
| 47-3914 | 2/1972 | Japan | 156/143 |
| 1347246 | 2/1974 | United Kingdom | 138/127 |
| 573366 | 9/1977 | U.S.S.R. | 156/143 |

*Primary Examiner*—Jeffery R. Thurlow
*Attorney, Agent, or Firm*—Staas & Halsey

[57] ABSTRACT

The invention relates to a method and an apparatus for the manufacture of high-pressure hose composed of a plastic core and a plurality of layers of helically wound plastic-resisting members formed in particular of plastic wires of high tensile strength which are rewound in a rewinding device from a supply reel onto several working spools, and optionally of an outer cover made of a plastic material. An intermediate layer of plastic yarn is disposed between every two helically wound pressure-resisting layers. After being unwound, the wires necessary for the helically wound pressure-resisting layers are precoiled over a hardened edge in the rewinding device and then wound onto the working spool in the stretched state. In accordance with the preferred embodiment, precoiling is done, not in a stranding machine, during hose production, but one stage earlier, in the rewinding device, where the individual wires are rewound from a supply reel onto so-called working spools.

18 Claims, 5 Drawing Figures

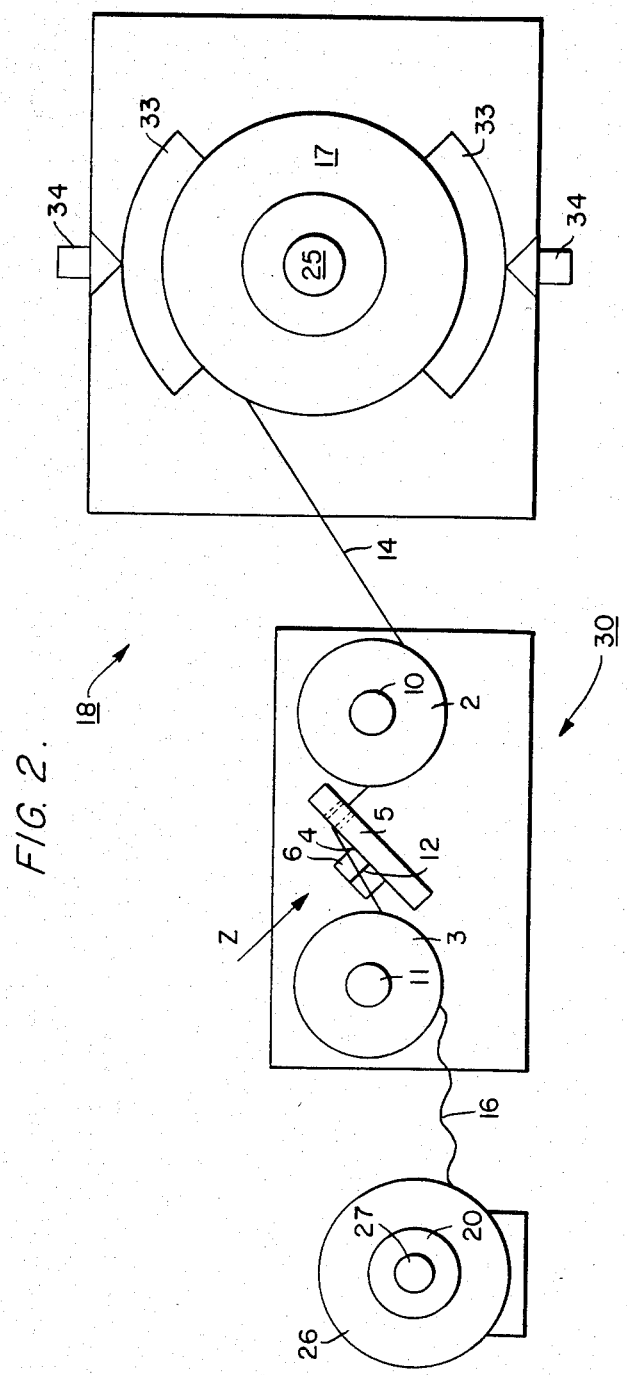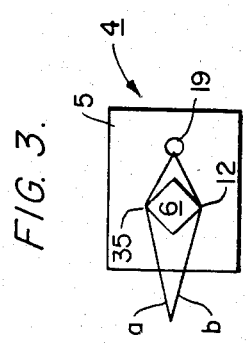

HIGH-PRESSURE HOSE AND METHOD FOR THE MANUFACTURE OF SAME

This is a continuation of application Ser. No. 381,648, filed May 24, 1982, now U.S. Pat. No. 4,444,707, issued Apr. 24, 1984.

BACKGROUND OF THE INVENTION

1. Field of the Invention

The invention relates to a high-pressure hose composed of a plastic core and a plurality of layers of helically wound pressure-resisting members, and the method for the manufacture of same, the members formed in particular of wires of high tensile strength which are rewound in a rewinding device from a supply reel onto several working spools, and optionally, of an outer cover made of a plastic material.

High-pressure hoses should possess good flexibility and bending properties coupled with some partial elasticity even at high operating pressures. To obtain these properties, a number of production techniques have come into use and will now be outlined.

2. Description of the Prior Art

In the manufacture of hose suited for high-pressure applications, and in particular of hose made of vulcanizable elastomers with braided or coiled pressure-resisting members, it is known to apply vulcanizable adhesion promotors/adhesives between the outer wall of the core and the pressure-resisting member as well as between the individual pressure-resisting members or between pressure-resisting members and the outer cover for the purpose of improving the adhesion. The bonding layer formed during vulcanization then is part of the hose wall. Apart from the advantage of improved homogeneity and the attendant higher fatigue strength and ability to withstand high working pressures, a good "rubber-to-metal" bond is achieved, and when the hose is cut to the desired lengths there is no unraveling of the braiding or of the coiled metal insert.

Moreover, with regard to such hose it is known to condition metal wires to improve their affinity for other adhesion promoters by electroplating them either with brass or with other metals. This is how their "affinity for rubber", alluded to above, in the vulcanizing process is obtained. An important prerequisite, however, is that the steel wires used have high grease resistance. In practice, this is very difficult to secure. For improvement of the rubber-to-metal bond, it is further known to add heavy-metal oxides to the bonding agent, which may produce a further improvement in the breaking-load values and hence in flexibility.

The measures described in German Pat. No. 1,188,388 relate solely to hose made of elastomers. In the case of the hose described in German Pat. No. 2,014,887, the use of vulcanizable mixtures as an intermediate layer is proposed for improvement of the flexibility.

Many other publications describe measures intended to improve the homogeneity and to secure the pressure-resisting members in the hose wall in order to prevent unraveling when the hose is cut to length. In all these publications, the assumption is made that vulcanization of the prefabricated hose is essential.

As is known, vulcanization is dispensed with in the production of thermoplastic pressure-resisting members, and in particular of coiled steel-wire pressure-resisting members. An inner tube and outer cover are strictly extruded. The conventional use of precoiled steel wires makes it unnecessary to use a separate adhesive since the coiled wires or windings remain in their original position even without the use of a separate adhesive.

Thermoplastic hose, and especially thermoplastic hose of higher compressive strength, requires the use of thermoplastics having relatively high strength properties. Now such materials are necessarily more rigid, and this is true especially of the inner core. In use, they therefore exhibit relatively poor bending properties, especially when more than two steel-wire windings must be applied. This is the case particularly with hose types which are designed for very high pressures, have a thicker core wall, and are made of plastics of the polyamide type, for example.

In the case of thermoplastic hose, too, it is known to apply adhesives between every two oppositely directed windings for the purpose of improving the flexibility. Since there is no vulcanization, these adhesives usually contain solvents. They are applied between the core of the hose and the first winding as well as between individual windings.

The drawback of such measures in the manufacture of thermoplastic hose is that the solvents contained in the adhesive must be eliminated before the outer cover is applied so that no gaseous release of residual solvents occurs due to the heat as the outer cover is extruded on. Such "outgassing" would preclude bonding of the outer cover to the pressure-resisting members. It is further possible to use two-component adhesives in place of solvent-containing adhesives, or to apply thermoplastics as bonding agents by the use of an additional extruder directly in the stranding operation. However, all these expedients require additional equipment which complicates handling considerably and entails extra costs.

Insertion of a hot-melt adhesive foil tape between the individual pressure-resisting layers, as proposed in German Pat. No. 2,223,523, has also proved deleterious in volume production since such foil must be activated through a heat treatment in an additional operation and thus entails extra costs.

In the manufacture of pressure hose made of elastomers and comprising steel-wire layers as pressure-resisting members, it is known to coil the steel wires in a forming device while production of the hose is in progress in order that the individual wires, adapted to the diameter of the hose core used, may be wrapped around the latter more or less firmly.

It is known to perform this coiling operation of the individual wires in the stranding machine, in other words, as they are wound onto the particular hose layer. This wire-forming operation thus is carried out just ahead of the so-called winding point by guiding the wires over a rounded sharp edge, whereby they are coiled.

At least two important requirements must be met to achieve such coiling. In the first place, the wire must have a certain minimum tension between the working spool and the winding point. Secondly, the hose core to be reinforced must possess sufficient compressive strength. This can be secured by the use of so-called mandrels which prior to their introduction into the helical-winding machine are supercooled to the point where they have very high rigidity.

However, this technique has several drawbacks: The changing diameter of the wire on the spool necessarily results in varying tensile forces, which steadily increase as the diameter of the coil of wire on the spool decreases in the course of production and therefore give rise to changing spiraling forces. Adjustment of the spool braking forces is difficult or possible only at very great cost since as is known the spools are arranged in a circle on a revolving stranding disk. The brakes of the spool must be firmly preset manually before production gets under way. In actual practice, this has a detrimental effect on precise maintenance of the hose diameter.

SUMMARY OF THE INVENTION

The present invention has as its object to provide a high-pressure hose and method of manufacture, whereby an improvement in bending properties is secured without vulcanization and without the use of adhesives, and without attendant drawbacks with respect to compressive strength, resistance to fluid impulses, or even increased wall thickness.

In accordance with the present invention, this object is accomplished in that an intermediate winding formed of yarn and in particular of plastic yarn, is applied between the helically wound wire pressure-resisting members.

The construction of the hose is such that a wire layer, which is helically wound in one direction, is wound onto the hose core. This wire layer is followed by an intermediate layer of plastic yarn in accordance with the invention. Onto this winding of plastic yarn the second wire layer is then wound, in a direction opposite to that of the first wire layer. Depending on the requirements, the hose may be formed of a plurality of wire layers, even in pairs. A layer of plastic yarn is then wound between every two wire layers. Finally, the hose is provided with a cover which generally is made of a thermoplastic material. The plastic winding is preferably formed of a polyester yarn of from 200 to 750 decitex (1 decitex=0.1 g/1 km) spun from individual filaments, so that a diameter ranging from 0.1 to 0.2 mm is preferably obtained. Introduction of the plastic winding substantially improves the bending properties of the hose.

After being unwound from the brakeable supply reel, the wires necessary for the helically wound layers of pressure-resisting members are preferably precoiled in the rewinding device, being passed first over a loosely mounted guide roller and through a hardened eyelet and then over a hardened edge, following which they are wound in the stretched state onto the working spools by way of a further guide roller.

Unwinding of the wires from the supply reels is done as follows: The supply reels carrying the wire are mounted freely rotatable in a stand on shafts which are parallel to the floor. The wires are drawn from the supply reel onto working spools driven by an electric motor. The rewinding device permits the simultaneous winding of wire from several supply reels onto several working spools. A device for the precoiling of the wires is disposed between every supply reel and the working spool mounted on the drive shaft of the electric motor.

The precoiling device consists of a base plate standing on edge on which two nonbrakeable guide rollers are freely rotatably mounted on pins. Mounted on the base plate between these two guide rollers carrying the wire are the actual precoiling members. These consist of a small metal cube which is bolted to the base plate at a certain angle. Set into this small cube is a hardened eyelet through which the wire from the first guide roller, which is directed toward the supply reel, is fed. On the side of the small metal cube facing the second guide roller, a hardened metal member of rectangular cross section is mounted in such a way that two diagonally opposed edges are directed toward the base plate and outwardly, respectively. The wire from the eyelet is led over one of the hardened edges and then to the second guide roller, which is directed toward the electric motor with the working spools. The wire coming off the second guide roller thus is precoiled. However, because of the tension produced by the electric drive motor the wire is wound onto the working spools in the stretched state.

Depending on the requirements, the wire are coiled either right hand or left hand.

Coiling the wires right hand or left hand is in keeping with the structure of the hose, since at least two oppositely directed windings have to be applied to it. The coiling direction is determined by the manner in which the wire is led past the hardened metal members. The wire is run either over the edge facing the base plate or the edge opposite that edge.

In accordance with a further embodiment, the wires required for the helically wound pressure-resisting layers are coiled over a hardened edge as the hose is being wound.

Actual hose winding is carried out on a stranding machine. The latter comprises at least one large stranding disk on which a plurality of working spools are mounted onto which spool, wire has been already wound in the manner described above. The shafts of these working spools extend parallel to the shaft of the stranding disk. The hose core to be wound, which generally is cooled, is drawn axially through the center of the stranding disk. During this axial motion of the hose core, the stranding disk carrying the working spools rotates about the hose core and winds the latter with the wires from the working spools which have been preformed in the rewinding device. Just ahead of the winding point, these wires are passed in the stranding machine once more over a rounded sharp edge and then wrapped around the hose. To impart to the wires a certain minimum tension, each working spool is brakeably mounted on the stranding disk. Next, the intermediate layer of plastic yarn in accordance with the invention is applied. This plastic intermediate layer is wrapped around the first wire layer in much the same way as described above. A second stranding machine then winds a second, oppositely directed wire layer around the hose. The hose, which now consists of a plastic core, a first wire layer, a plastic intermediate layer and a second wire layer, then is covered by means of an extruder with a plastic material. Depending on the pressure requirements, the hose may be built up from several pairs of wire layers, with a plastic winding disposed between the individual wire layers.

In accordance with the present invention, the above object is accomplished in that the rewinding device comprises a wire-forming device, consisting essentially of a hardened edge, and electronic measuring and control means for the continuous control or regulation of the wire tension, said control means reducing the rotative speed of the supply reel to a greater or lesser extent.

In accordance with the preferred embodiment of the present invention, precoiling and forming thus is done, not during production of the hose, and hence in the stranding machine, but one stage earlier, namely, in the rewinding device, as the individual wires are rewound from the supply reel onto the working spool. The winding device thus comprises a special wire-forming device. Pre-shaping or forming as such is done over a hardened edge. Precise and constant wire tension is an essential prerequisite of the present invention to proper rewinding of the wires. Therefore, the wire tension is continuously monitored in the rewinding device and, when necessary, adjusted. Control is exercised through fine adjustment of braking forces acting on the shaft of the supply reel. In this way, the degree to which the individual wires are formed and pre-shaped is held constant over maximum wire runs.

The braking of the supply reel is preferably effected electromagnetically, and the brakes of the supply reel may be electromagnetic brakes.

In accordance with a particularly preferred embodiment, braking is effected by means of compressed-air diaphragm brakes.

Electromagnetic braking or braking by means of pneumatic diaphragm brakes is done at the supply reels and is controlled by the magnitude of the tension. The absence of tension results in a braking of each supply reel while the presence of tension produces a (partial) release of the brakes, depending on the magnitude of the tension.

The principal advantages obtained through the present invention are that the high-pressure hose so produced possesses good bending properties and flexibility. Through the helical effect of the preformed wires, unraveling is prevented. This is of considerable importance in the finished hose and when it is cut to size. Further advantages stem from the control of the braking members; the diameter of the wire helix is accurately maintained on the basis of the hose-core diameter, and the exact pitch of that helix can also be readily set on the basis of the neutral winding angle.

These together with other objects and advantages which will become subsequently apparent reside in the details of construction and operation as more fully hereinafter described and claimed reference being had to the accompanying drawings forming a part hereof, wherein like numerals refer to like parts throughout.

BRIEF DESCRIPTION OF THE DRAWING

FIG. 2 is a side-elevational view of the rewinding device;

FIG. 3 is a partial view of the wire guide per se;

DESCRIPTION OF THE PREFERRED EMBODIMENTS

Figure 1:
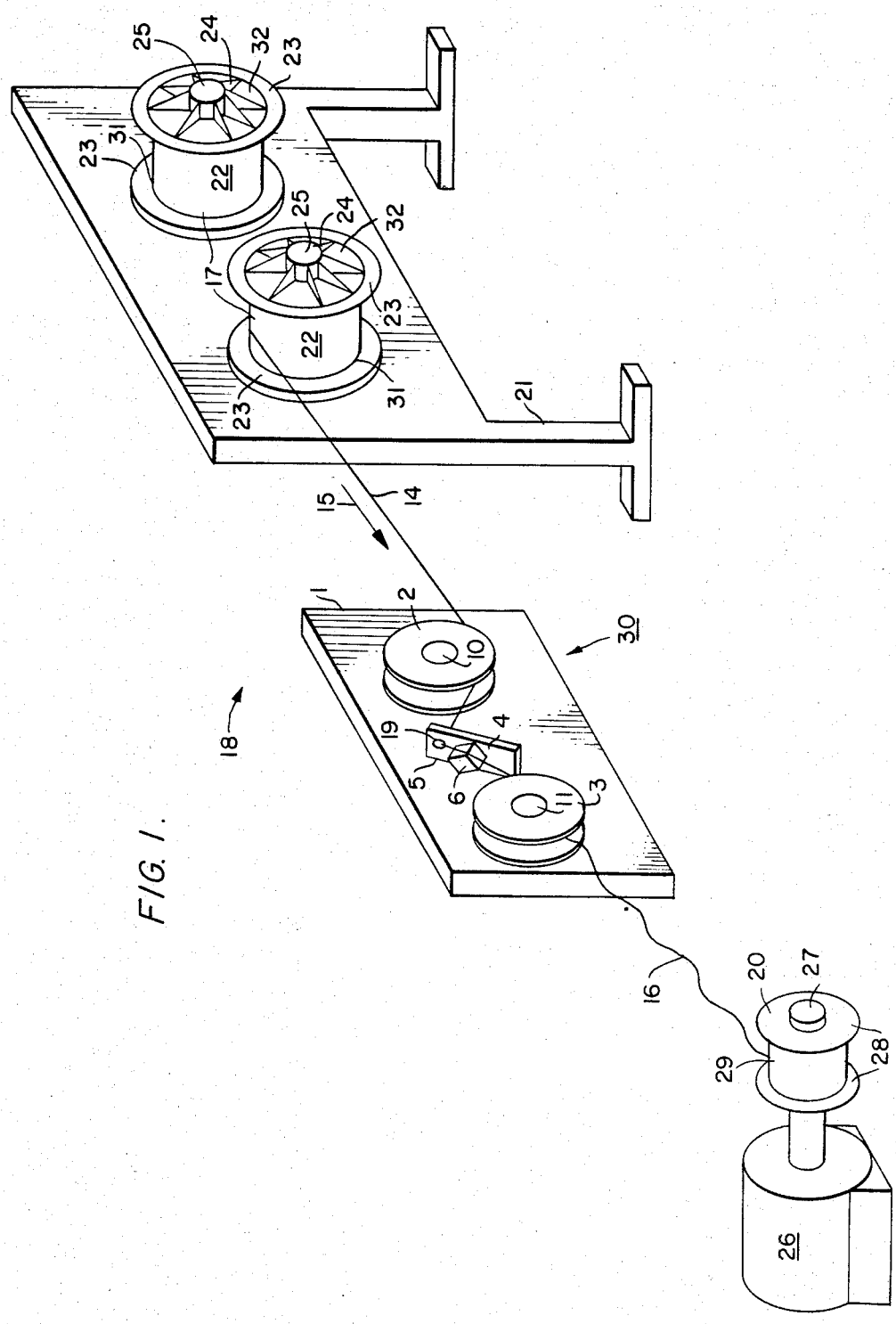
FIG. 1 is a perspective view of the entire rewinding device.

FIG. 1 is a perspective view of the entire rewinding device in accordance with the present invention. The wire 14 to be wound onto a working spool 20 is unwound (arrow 15) by means of an electric motor 26 from a supply reel 17 by way of a precoiling or reshaping device 30. The supply reels 17 carrying the wire 14 are formed by a cylinder 22 at whose ends 31 disklike rims 23 are mounted. The rims 31 are of larger diameter than cylinder 22 for projecting beyond the cylinder 22. The disklike rims 23 are provided on their external surfaces 32 with reinforcing ribs 24. The supply reels 17 are mounted on shafts 25 disposed parallel to the floor on a stand 21. The wire 14 to be unwound from the supply reel 14 is run through the precoiling device 30 and wound onto a working spool 20 by use of an electric motor 26. The working spool 20 is constructed conventionally and consists of a cylindrical member 29 with laterally projecting disklike rims 28. The working spool 20 is mounted directly on the drive shaft 27 of the electric motor 26.

During the rewinding of the wire 14, the supply reels 17 are braked to a greater or lesser extent on the basis of the wire tension. Braking of the supply reels 17 can be effected in different ways. One method is mechanical braking by use of a lever system controlled by the wire itself. To this end, the wire coming off the supply reel is first passed over a cylindrical roller disposed above and in close proximity to the supply reel. Such roller is mounted on a lever which at high tension partially releases the brake and at low tension applies it as required. This braking method is not illustrated in FIG. 1. Another method is to measure the wire tension electronically and to use these measurements for the control of an electromagnetic or pneumatic diaphragm brake, which then reduces the rotative speed of the supply reel to a greater or lesser extent.

For reasons of economy, a plurality of working spools mounted side by side on the drive shaft 27 may be wound with wire by use of the same electric motor. Each of these working spools will then have associated with it a precoiling structure 30 and a supply reel 17. A plurality of supply reels will then be disposed on the stand 21. The precoiling structures will then be located side by side so that each wire is wound directly onto the working spool associated with it. At 16 in FIG. 1, the precoiled wire 14 is shown to snake, for greater clarity. However, in reality, the wire is wound onto the working spool 20 in the stretched state.

The rewinding device 18, of which FIG. 1 is a perspective view, is shown in FIG. 2 in a side-elevational view. The reference numerals in FIG. 2 are the same as in FIG. 1. Indicated in FIG. 2 are the brake shoes 33 necessary for the braking of each supply reel 17. The directions of the braking forces are indicated by arrows 34. The wire 14 is conducted through the precoiling structure 30, described further on. In essence, the wire 14 is precoiled by being passed over an edge 12 of a cubical member 6. FIG. 3 is a top plan view Z of this forming structure. Depending on whether the wire is to be coiled left hand or right hand, it is run either over the edge 35 or over the edge 12 of the cubical member 6. In FIG. 3, these two alternatives are designated a and b.

Figure 4:
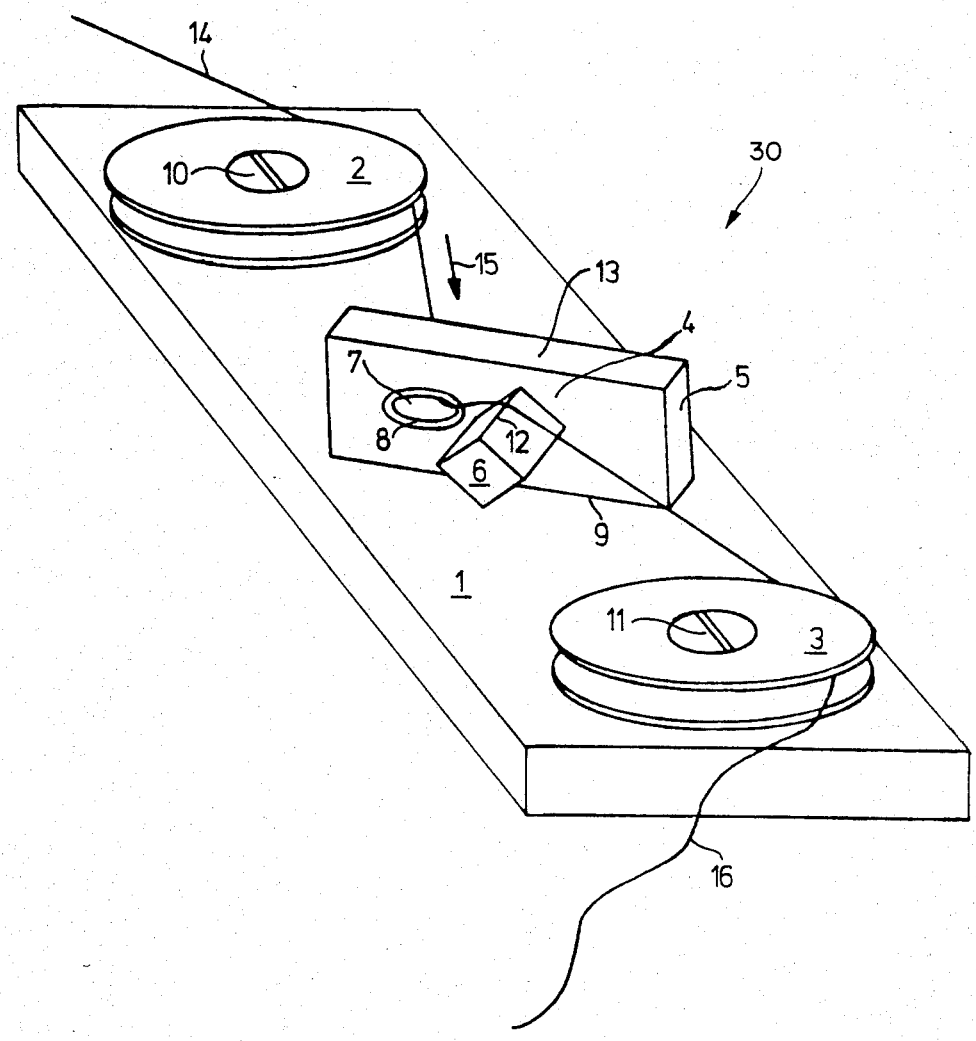
FIG. 4 is a perspective view of the wire precoiling and forming device.

FIG. 4 is a detail view of the precoiling structure 30. The latter consists of a base plate 1 carrying two rollers 2 and 3 which are free to turn on shafts 10 and 11. Disposed between the rollers 2 and 3 is the forming member 4. The latter consists of two parallelepipedal members 5 and 6. The larger of these members, 5, is provided through its side with a bore 7 into which a hardened eyelet 19 is set. The longer side 9 of the parallelepipedal member 5 is arranged at a certain angle to a connecting line between the axes 10 and 11 of the two rollers 2 and 3. That pre-set angle determines the pitch of the wire helix.

Just downstream of the bore 7, a smaller hardened parallelepipedal member 6 is mounted on member 5 in such a way that one of the longer edges 12 of member 6 is directed toward the longer narrow side 13 of member 5. The wire 14 is thus run from the supply reel 17, shown in FIG. 1, over the roller 2, through the hardened eyelet 19 and over the edge 12, or the edge 35 (in FIG. 3), of the member 6, and then over the roller 3. The wire so precoiled is then wound onto the working spool 20 in the manner described above. The wire is run in the direction toward the coiled pre-shaped end indicated by the reference numeral 16.

Figure 5:
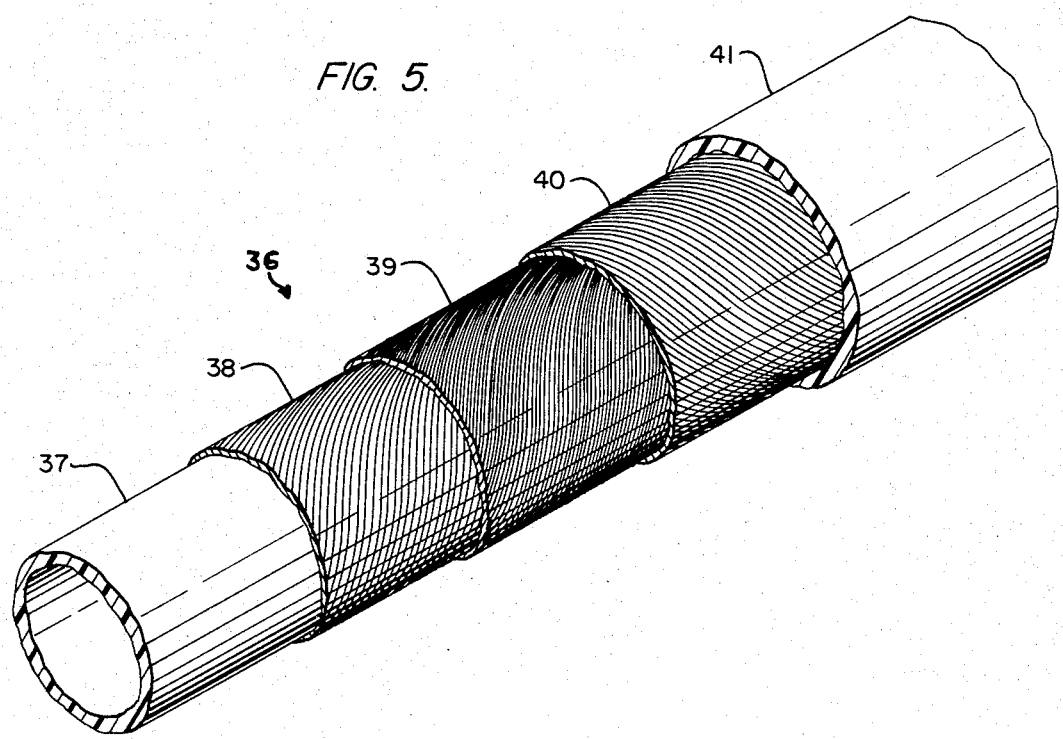
FIG. 5 is a sectional view of the high-pressure hose formed by the method in accordance with the invention.

Actual hose winding is carried out on a stranding machine. The latter comprises at least one large stranding disk on which a plurality of working spools are mounted onto which spool, wire 14 has been already wound in the manner described above. The shafts of these working spools extend parallel to the shaft of the stranding disk. A plastic hose core 37 (FIG. 5) to be wound, which generally is cooled, is drawn axially through the center of the stranding disk. During this axial motion of the hose core 37, the stranding disk carrying the working spools rotates about the hose core 37 and winds the latter with the wires 14 from the working spools which have been performed in the rewinding device as described earlier. Just ahead of the winding point, these wires 14 are passed in the stranding machine once more over a rounded sharp edge and then wrapped around the hose core 37 to form the first wire layer 38. To impart to the wires 14 a certain minimum and controlled tension, each working spool is breakably mounted on the stranding disk. Next, the intermediate layer 39 of plastic yarn is applied in accordance with the invention. This plastic intermediate layer 39 is wrapped around the first wire layer 38 of wires 14 in much the same way as described above. A second stranding machine then winds a second, oppositely directed second wire layer 40 of wires 14 around the hose. The hose 36 as shown in FIG. 5, which now consists of the plastic core 37, the first wire layer 38, the plastic intermediate layer 39 and the second wire layer 40, then is covered by means of an extruder with an outer layer 41 of plastic material. Depending on the pressure requirements, the hose 36 may be built up from several pairs of wire layers 38 and 40, with a plastic intermediate winding layer 39 disposed between the individual wire layers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

LIST OF REFERENCE NUMERALS

1. Base plate
2. Roller
3. Roller
4. Forming member
5. Cubical member; parallelepipedal member
6. Parallelepipedal member
7. Bore
9. Side of parallelepipedal member
10. Shaft of roller 2
11. Shaft of roller 3
12. Edge or parallelepipedal member 6
13. Edge of parallelepipedal member 5
14. Wire
15. Direction-indicating arrow
16. Precoiling
17. Supply reel
18. Rewinding device
19. Eyelet
20. Working spool
21. Stand
22. Cylinder
23. Rim
24. Reinforcing ribs
25. Shaft of supply reel
26. Electric motor
27. Drive shaft
28. Rim
29. Cylinder
30. Precoiling means
31. Cylinder faces
32. External surfaces
33. Brake shoes
34. Direction of braking forces
35. Edge
36. Hose
37. Hose core
38. Hose first wire layer
39. Hose intermediate layer
40. Hose second wire layer
41. Hose outer layer
a. Wire
b. Wire
Z. Partial view

What is claimed is:

1. A high-pressure hose comprising:
   (a) a plastic hose core;
   (b) a first layer of only pre-helically formed pressure-resisting wire members of high-tensile strength wire strands wound around the plastic hose core without a pressure-resisting fabric layer therebetween;
   (c) an unbonded intermediate layer formed of plastic yarn spun from individual filaments wrapped without bonding around said first layer of pressure-resisting wire members;
   (d) a second layer of only pre-helically formed pressure-resisting wire members of high-tensile strength strands directly wound around the intermediate layer; and
   (e) an outer hose cover.

2. The high-pressure hose of claim 1, wherein the intermediate layer is formed of a polyester yarn spun from individual filaments.

3. The high-pressure hose of claim 1, wherein the second layer of pressure-resisting wire members is wound in a direction opposite to the first layer of pressure-resisting wire members.

4. The high-pressure hose of claim 2, wherein the second layer of pressure-resisting wire members is wound in a direction opposite to the first layer of pressure-resisting wire members.

5. The high-pressure hose of claim 1, wherein the plastic hose core is cooled when the first layer of pressure-resisting wire members is wound around the hose core.

6. The high-pressure hose of claim 2, wherein the plastic hose core is cooled when the first layer of pressure-resisting wire members is wound around the hose core.

7. The high-pressure hose of claim 3, wherein the plastic hose core is cooled when the first layer of pressure-resisting wire members is wound around the hose core.

8. The high-pressure hose of claim 1, wherein the intermediate layer is formed of a plastic yarn of 200 to 750 decitex spun from individual filaments.

9. The high-pressure hose of claim 2, wherein the intermediate layer is formed of a plastic yarn of 200 to 750 decitex spun from individual filaments.

10. The high-pressure hose of claim 3, wherein the intermediate layer is formed of a plastic yarn of 200 to 750 decitex spun from individual filaments.

11. The high-pressure hose of claim 5, wherein the intermediate layer is formed of a plastic yarn of 200 to 750 decitex spun from individual filaments.

12. The high-pressure hose of claim 7, wherein the intermediate layer is formed of a plastic yarn of 200 to 750 decitex spun from individual filaments.

13. The high-pressure hose of claim 1 comprising a plurality of pairs of layers of pre-helically formed pressure-resisting wire members of high-tensile strength strands wound onto the hose and an unbonded intermediate layer formed of plastic yarn spun from individual filaments wound onto the hose between said pairs of wire member layers.

14. The high-pressure hose of claim 13, wherein the wire member layers of said pairs are wound onto the hose in directions opposite to each other.

15. The high-pressure hose of claim 1, wherein said first and second layers of pre-helically formed wire members are wound around the respective hose core and intermediate layer with pre-determined controlled tension.

16. The high-pressure hose of claim 5, wherein said first and second layers of pre-helically formed wire members are wound around the respective hose core and intermediate layer with pre-determined controlled tension.

17. The high-pressure hose of claim 6, wherein said first and second layers of pre-helically formed wire members are wound around the respective hose core and intermediate layer with pre-determined controlled tension.

18. The high-pressure hose of claim 13, wherein said plurality of pairs of layers of pre-helically formed wire members are wound onto the hose with pre-determined controlled tension.

* * * * *

UNITED STATES PATENT AND TRADEMARK OFFICE
CERTIFICATE OF CORRECTION

PATENT NO. : 4,537,222

DATED : Aug. 27, 1985

INVENTOR(S) : Schwarz

It is certified that error appears in the above-identified patent and that said Letters Patent is hereby corrected as shown below:

```
Front page [57] ABSTRACT:
line 4, "plastic-resisting" should be --pressure-resisting--;
line 4, delete "plastic" (second occurrence).
```

Signed and Sealed this

Seventh Day of January 1986

[SEAL]

Attest:

DONALD J. QUIGG

Attesting Officer

Commissioner of Patents and Trademarks